United States Patent [19]
Zukerman

[11] 3,961,087
[45] June 1, 1976

[54] PROCESS FOR PREPARING COOKED RICE
[75] Inventor: Harold W. Zukerman, Skokie, Ill.
[73] Assignee: American Frozen Foods Corporation, Wichita, Kans.
[22] Filed: Mar. 28, 1974
[21] Appl. No.: 455,606

[52] U.S. Cl. ............... 426/262; 426/268; 426/271; 426/272; 426/618; 426/296
[51] Int. Cl.² .................... A23L 1/168
[58] Field of Search ........... 426/208, 309, 271, 355, 426/272, 352, 262

[56] References Cited
UNITED STATES PATENTS

| | | | |
|---|---|---|---|
| 2,898,215 | 8/1959 | Ferrel | 426/309 |
| 3,343,964 | 9/1967 | Thomas | 426/208 X |
| 3,484,249 | 12/1969 | Tanaka et al. | 426/355 |
| 3,523,025 | 8/1970 | McGinley | 426/271 |
| 3,526,511 | 9/1970 | Rockland | 426/355 |
| 3,711,295 | 1/1973 | Zukerman | 426/145 |
| 3,835,225 | 9/1974 | Rutledge | 426/208 |

*Primary Examiner*—Raymond N. Jones

[57] ABSTRACT

A process for preparation of a cooked rice which has its grains joined together and a portion of its amylose and amylopectin modified by utilizing starch-complexing agents.

12 Claims, No Drawings

PROCESS FOR PREPARING COOKED RICE

BACKGROUND OF THE INVENTION

The processing procedures for making shaped rice products are set forth in U.S. Pat. No. 3,711,295. Many of the special physical properties of shaped rice products such as light-density texture, dryness, flavor, freeze/thaw stability, and firmness are the result of the characteristics of the rice from which it is made. It was first determined which special physical properties were to be incorporated into the finished product. It was then necessary to purchase and use the particular varieties of rice that would produce these properties.

This selection of particular varieties of rice had to be followed because the various properties of raw rice are so different. These rice properties include rice flavor, individual cooking time and temperature, freeze/thaw resistance, and textural qualities such as rubberiness, pastiness, dryness, stickiness, density, softness, and firmness. Even identical rice varieties grown within the same location have physical properties that vary. When the same rice varieties which are grown in different locations are compared, the variations in physical properties are even greater. Also, the properties of imported rice vary greatly from domestic rice. In addition, the aging of rice creates changes in rice properties. In fact, the properties of even the same batch of rice change from the time the rice is freshly harvested until it is entirely consumed the next year. Therefore, it was necessary to purchase and use only the particular varieties of properly aged rice that would give the desired properties in the finished product.

It is desirable to use domestic and/or foreign, off-color, broken-grain rice, or rice particles, because they are less expensive and produce a finished product which is as good as that produced with whole-grain rice. Until recently, one could easily purchase these rice by-products inexpensively and according to the variety of rice they originated from. At the present time, rice is more expensive because of a world shortage. As a result, identified whole-grain rice and off-grade rice can still be obtained but only at a premium price. The least expensive way to purchase rice by-products is in a bulk mixture of unidentified rice.

A knowledge of the rice variety and its age permits a fairly accurate prediction of its cooking conditions and finished product textural properties (i.e. softness, density, dryness, pastiness, and compactness). However, when a mixture of unidentified rice varieties is cooked together, part of the rice may become over-cooked and pasty while the remaining rice may be under-cooked and grainy. Even when only one variety of unknown rice is used, occasionally the proper cooking time and temperature is misjudged and the rice can either be over-cooked or under-cooked. Finally, even when only one variety of unknown rice is used, it may be of the type that produces poor textural properties even if properly cooked.

OBJECTS OF THE INVENTION

It is an object of the present invention to provide an improved process for the conversion of unidentified rices into cooked rice products.

Another object of the invention is to assure good freeze/thaw resistance in the finished product, even when rice with poor freeze/thaw properties is used. Freeze/thaw stability properties are important because the manufacturer cannot always control the shipping, storage, and handling conditions of the frozen product while it is moved from the manufacturer's warehouse to the consumer. Sometimes, the product becomes thawed once or several times, either on warehouse docks, in freezer trucks, or in stores. Each time, it is slowly refrozen at 0° F. This thawing and slow refreezing abuse is particularly hard on the Shaped Rice Product's texture.

A further object of the invention is to assure that the finished product's surface color does not become excessively dark and its rate of fat rancidity development is reduced, even when the heavy metal content of the rice is higher than normal.

Still another object of the invention is to assure good textural properties in the finished product, even when rice that usually produces poor textural properties is used as the raw material.

BRIEF SUMMARY OF THE INVENTION

The invention consists of the discovery of a new process for the conversion of unidentified rices into finished products. The modification of the amylose and amylopectin of the rice converts all rices, even rice that usually produces poor texture properties into a "modified rice" which possesses a desireable texture. This may be accomplished by modification or complexation of the rice starch. The necessary reaction may be tailored to produce the desired physical properties within the finished product. Alternatively, an already modified corn, rice, potato, tapioca, or sorghum starch may be incorporated with the cooked rice. The more effective procedure, however, is the modification of the amylose and amylopectin of the rice starch.

A selection of one or several starch-complexing agents can be reacted with the starch to selectively develop within the finished product such special physical properties as freeze/thaw stability, light-density texture, and dryness without pastiness without developing the negative physical properties of excessive starch modification such as excessive product softness. Effective starch complexing agents consist of glyceryl monopalmitate, glyceryl monolaurate, glyceryl monomyristate, glyceryl monostearate, glyceryl monoarachidate, glyceryl monooleate, glyceryl monolinoleate, calcium stearyl-2-lactylate, sodium steroyl-2-lactylate, polyoxyethylene monostearate, sodium stearoyl-fumate, sucrose fatty acids, and succinylated monoglycerides.

A second but less effective method is the incorporation of one or several already modified starches, such as mono-starch phosphate. Modified starches can be made from corn, sorghum, rice, potato, and tapioca and should be used in levels up to about 10% of the weight of the added dry rice. Modified starches are added to selectively achieve particular physical properties in the Shaped Rice Product such as improved freeze/thaw stability, reduced pastiness, and light-density texture. Modified starches which may be used include monostarch and/or cross-linked starch esters and/or ethers such as acetate esters, hydroxypropyl ethers, and phosphate esters. These are prepared by reacting the starch of corn, sorghum, rice, potato, or tapioca with compounds such as vinyl acetate, acetic anhydride, propylene oxide, orthophosphate, phosphorous oxychloride, sodium trimetaphosphate and epichlorohydrin.

In addition, the starch of the natural rice itself may be modified into mono-starch and/or cross-linked starch esters and/or ethers by reacting it with one or more compounds selected from the group consisting of vinyl acetate, acetic anhydride, propylene oxide, orthophosphate, phosphorous oxychloride, sodium trimetaphosphate and epichlorohydrin.

The invention further consists of the discovery that a chelating agent may be utilized to assure that the finished product's surface color does not become excessively dark and its rate of fat rancidity development is reduced, even when the heavy metal content of the rice is higher than normal. When a chelating agent such as sodium acid-pyrophosphate is added to the cooking water and is absorbed by the rice, it complexes with heavy metals and prevents these undesireable effects. The color of the surface does not become black when deep-fat-fried. Instead, a pleasing golden brown color is produced. Although the fat can still become rancid after the heavy metals are complexed in this manner, the rate of oxidative rancidity development is reduced.

DETAILED DESCRIPTION OF THE INVENTION

Dry rice in the form of mixtures of whole-grain, broken grain, and rice particles can be received and temporarily stored together. Specific varieties of rice are stored separately. The rice mixtures, separated into whole grains, broken grains, and rice particles are then cleaned. All foreign material and all defective rice is removed and discarded. Off-color, broken-grain, and rice particles are not considered to be defective rice. They are an excellent raw material providing they are of wholesome quality and have a good taste and odor.

The clean dry rice should be first pre-heated to about 160° F. A single- or double-screw conveyor that is equipped with a steam-jacket and/or hollow flight screws is an excellent pre-heater. The heat from the steam in the conveyor's jacket or flights warms the clean dry rice as it moves to the rice-cooking equipment. Vents, located on the conveyor's cover, help remove excessive steam evolving from the heated rice. The dry rice preheating step assures that the temperature of the cooking water for the rice will not be lowered because of the cold rice. This is desireable since most of the starch-complexing chemicals are insoluble or only very slightly soluble in cold water. They become much more soluble in hot water. To assure an efficient starch-complexing reaction, the water for cooking rice should have a steady temperature maintained at about 190° F. to about 210° F.

The preparation of the cooking water for the rice may be accomplished in a steam-jacketed kettle equipped with mixers that create good turbulent agitation. The water is heated to 190° F. The complexing chemicals, if dry, can be pre-mixed with the powdered flavoring ingredients, such as salt, monosodium glutamate, and powdered onion and slowly poured into the heated and agitated water. When the starch complexing chemicals are in solution, the oil and oil containing flavors such as cheese and the larger flavoring particles such as onions are added. A chelating agent such as sodium acid pyrophosphate should be added to the solution if the heavy metal content of the rice is high.

A variety of tests were conducted in which the chelating agent was dissolved in a starch solution and the starch solution then topically coated onto the Shaped Rice Units. The starches tested were high amylose, high amylopectin, and modified starches of rice, potato, tapioca, and wheat. These tests indicated that the topically applied solutions produced about the same surface color, physical properties, and textural crust as was obtained when the chelating agent was merely put into the water that cooks the rice. The extra step did not make the units more structurally stable, or improve their taste or textural properties, or eliminate the heating step which is essential to the formation or "setting" of the crust.

The pre-heated rice particles or grains are moved to the cookers at a rate of about one pound of dry rice for every 2.5 to 4.0 pounds of hot water solution. The dry rice and the hot water solution both enter and become mixed together in the cooker. The water solution which contains the starch complexing chemicals is heated to about 190° F. to 210° F. in the cooker as the rice is gently agitated. Within about 20 minutes, the rice absorbs most of the water and its starch has been reacted with the starch complexing chemicals. Then, it is discharged from the cooker before the rice grains become joined or bonded together.

The cooked rice grains become joined to each other without added gelling agents or vegetable gums or polymeric carbohydrates such as sodium alginate or low methoxyl pectin which gel when water soluble calcium salts are added. These gelling agents can be used to assist in the production of special textural effects in the rice product, but the same or similar texture can be obtained with the modified starch technique. Because these added gelling agents add a foreign taste to the rice product, they are usually avoided.

The hot, moist rice grains continue to absorb surface moisture. Cooked rice with about 55% moisture may require gentle compression to bond or join the rice grains together while rice with about 70% to 80% moisture usually becomes joined without compression. Rice that cannot be joined is improperly prepared.

Rice can be cooked at temperatures greater than 212° F. in pressure cookers. This cooking increases the rate of moisture absorption and of the starch modification reaction. It may also afford a better starch complex for those starch-complexing chemicals that only react at the elevated temperatures.

The following examples further illustrate the invention:

EXAMPLE I

One hundred pounds of broken-grain rice was pre-heated to about 150° F. and then added to a cooking kettle that contained 375 lbs. of water, 2.5 lbs of vegetable oil, 1.0 lbs. of pure distilled glyceryl monostearate, 4.2 lbs. of salt, 1.25 lbs. of monosodium glutamate, 0.4375 lbs. of dextrose and 0.020 lbs. of sodium acid pyrophosphate. The rice slowly absorbed the water while it was simmering at a temperature of about 190° F. to 210° F. for about 20 minutes. During this period of heating, the rice grains were gently agitated so that the grains would uniformly absorb the water and monoglyceride with a minimum of rice-cell breakage. The fully cooked rice was usually discharged from the heating apparatus before the grains became joined and difficult to transfer. Subsequently, the fully cooked and water swollen grains became joined to each other.

EXAMPLE II

One hundred pounds of broken-grain rice was preheated to about 150°F. and then added to a cooking kettle which contained 350 lbs. of water, 4.2 lbs. of salt, 0.4 lbs. of dextrose, 1.25 lbs. of monosodium glutamate, 5 lbs. of corn monostarch phosphate, and 5 lbs.

of versa-stabe (a phosphate crossbonded waxy corn starch from C.P.C. International). The mixture was allowed to simmer at a temperature of 200°F. for about 20 minutes while the rice grains were gently agitated. The resulting fully cooked rice was then discharged onto a conveyor belt where the grains became joined to each other.

I claim:

1. A process for preparing a cooked rice product having its grains or particles joined together and having a portion of its amylose and amylopectin modified which comprises:
   a. mixing rice grains or particles with water which contains a starch complexing agent wherein the ratio of complexing agent to dry rice is about 1 lb. of complexing agent to about 100 lbs. of dry rice;
   b. heating the mixture at about 190°F to about 210°F for a period of time sufficient for the rice grains or particles to absorb from 1 to 4.0 pounds of water per pound of said grains or particles;
   c. forming the rice grains or particles into units of a given shape; and
   d. heating said units to provide a product having an exterior that is harder than the interior of said product.

2. The process set forth in claim 1 wherein said starch complexing agent is selected from the group consisting of glyceryl monopalmitate, glyceryl monolaurate, glyceryl monomyristate, glyceryl monostearate, glyceryl monoarachidate, glyceryl monooleate, glyceryl monolinoleate, calcium stearoyl-2-lactylate, sodium stearoyl-2-lactylate, polyoxyethylene monostearate, sodium stearoyl fumarate, and succinylated monoglycerides.

3. The process set forth in claim 1 wherein a chelating agent selected from the group consisting of sodium acid pyrophosphate and sodium ethylenediaminetetraacetic acid is added to said water containing a starch complexing agent.

4. The process set forth in claim 1 wherein said product is frozen for storage and shipping.

5. The process set forth in claim 1 wherein flavoring ingredients are added to said water containing a starch complexing agent.

6. The process set forth in claim 1 wherein said rice grains or particles are joined to each other by compression after said heating with water containing a starch complexing agent.

7. The process set forth in claim 1 wherein said complexing agent is glycerol monostearate.

8. A process for preparing a cooked rice product having its grains or particles joined which comprises:
   a. mixing rice grains or particles with an aqueous solution of modified starch selected from the group consisting of monostarch esters, monostarch ethers, cross-linked starch esters, and cross-linked starch ethers;
   said starch being in an amount sufficient to improve freeze/thaw stability, reduced pastiness and light-density texture and in an amount up to about 10% of the weight of dry rice;
   b. heating the mixture at a temperature of 190°F to 210°F for a period of time sufficient for the rice grains or particles to absorb from 1 to 4.0 pounds of water per pound of said grains or particles;
   c. forming the rice grains or particles into units of a given shape; and
   d. heating said units to provide a product having an exterior that is harder than the interior of said product.

9. The process set forth in claim 8 wherein said product is frozen for storage and shipping.

10. The process set forth in claim 8 wherein flavoring ingredients are added to said aqueous solution.

11. The process set forth in claim 8 wherein a chelating agent selected from the group consisting a sodium acid pyrophosphate and sodium ethylenediaminetetraacetic acid is added to said aquious solution.

12. The process set forth in claim 8 wherein said rice grains or particles are joined to each other by compression after said heating with water containing a modified starch.

* * * * *